US009483852B2

(12) United States Patent
Auga et al.

(10) Patent No.: US 9,483,852 B2
(45) Date of Patent: Nov. 1, 2016

(54) METHOD FOR DISPLAYING AND MANIPULATING GENEALOGICAL DATA USING A FULL FAMILY GRAPH

(71) Applicants: Thomas Michael Auga, Greeley, CO (US); Christopher Jacob Giesey, Branson, MO (US)

(72) Inventors: Thomas Michael Auga, Greeley, CO (US); Christopher Jacob Giesey, Branson, MO (US)

( * ) Notice: Subject to any disclaimer, the term of this patent is extended or adjusted under 35 U.S.C. 154(b) by 545 days.

(21) Appl. No.: 14/011,246

(22) Filed: Aug. 27, 2013

(65) Prior Publication Data
US 2014/0055482 A1 Feb. 27, 2014

Related U.S. Application Data

(60) Provisional application No. 61/693,522, filed on Aug. 27, 2012.

(51) Int. Cl.
| | | |
|---|---|---|
| *G06T 11/20* | (2006.01) | |
| *G06F 7/00* | (2006.01) | |
| *G06F 17/30* | (2006.01) | |
| *G06F 7/24* | (2006.01) | |

(52) U.S. Cl.
CPC ............... *G06T 11/206* (2013.01); *G06F 7/24* (2013.01); *G06F 17/30864* (2013.01); *G06F 17/30867* (2013.01); *G06F 17/30958* (2013.01)

(58) Field of Classification Search
CPC .. G06T 11/206; G06F 17/30864; G06F 7/24; G06F 17/30867; G06F 17/30961; G06F 17/30958; G06F 9/546; G06F 8/00; G06F 17/30067
USPC ........... 345/440, 440.1, 440.2; 707/736, 752, 707/791, 797–801, 829
See application file for complete search history.

(56) References Cited

U.S. PATENT DOCUMENTS

| | | | | |
|---|---|---|---|---|
| 2010/0106573 A1* | 4/2010 | Gallagher | .............. | G06Q 30/02 705/14.4 |
| 2012/0191703 A1* | 7/2012 | Huff | .................... | G06Q 10/063 707/722 |

* cited by examiner

*Primary Examiner* — Ke Xiao
*Assistant Examiner* — Andrew Shin

(57) ABSTRACT

A method for displaying and manipulating genealogical data using a full family graph. The genealogical data is obtained from external sources and is stored in a full family graph database. A unique identifier is assigned to each individual and family grouping. The full family graph is built up based on the direct bloodline of the male member of each family block. In addition, the bloodline of family blocks initiated from the wife's parents and the bloodline of family blocks initiated from the daughter's family block with her husband are also added to achieve a complete full family graph. In each bloodline, the family blocks are organized in a predetermined order based on the genealogical relationships of the male member of each family block. Moreover, a few functions such as search, zoom and navigator are provided to the full family graph.

17 Claims, 20 Drawing Sheets
(13 of 20 Drawing Sheet(s) Filed in Color)

Figure 15

METHOD FOR DISPLAYING AND MANIPULATING GENEALOGICAL DATA USING A FULL FAMILY GRAPH

The current application claims a priority to the U.S. Provisional Patent Application Ser. No. 61/693,552, filed on Aug. 27, 2012.

FIELD OF THE INVENTION

The present invention relates generally to a system and method for displaying genealogical data. More specifically, the present invention is a system and method for displaying a full family graph by using genealogical data.

BACKGROUND OF THE INVENTION

People are always interested in the information about who is their ancestors and if certain ancestor(s) are a historic person, hero or other famous one. A convenient way to record, search, and/or display such information is certainly in demand. Currently, there are many approaches and designs trying to meet the needs; and most of them are very similar to a traditional family tree. People are familiar with such traditional family trees. However, there are a few intrinsic problems associated with such kind of family tree. Some major problems are described as follows.

One major issue of the currently available genealogical mapping tools is the difficulty to accurately and effectively display all family relations in a single graph format. The most common genealogical mapping tools are pedigree charts, also commonly known as family trees as mentioned above. While the problem with these types of genealogical graphs is that they only display direct family relations, such as parents and grandparents, and do not show how family groupings relate. They do not show common ancestors such as siblings, cousins, etc. In addition, pedigree charts cannot easily show relationships between individuals of common ancestry. An example of this is cousins that many. This is pretty common in history.

It is also a fault of the pedigree chart design to show a family grouping and/or its relationship links multiple times in the event that errors in the data are present. These errors can come in the form of duplicate individuals, duplicate family groupings or circular references. The pedigree chart layout makes these errors difficult to understand and difficult to find by users. A variation of the pedigree chart is the enhanced pedigree display. This design shows common ancestors but requires the user to zoom in and out of areas in the graph or use various view features to show duplications and other data features. Thus, the enhanced pedigree display does not alleviate the faults of the standard pedigree display.

Another problem associated with the pedigree charts lies in the fact that they allow data to be presented in a directed cyclic graph. This means that data can loop back to itself, an example being that an individual can be shown as their own ancestor. This may lead to some confusion in some cases. By allowing data to be stored in a cyclic fashion, there is much room for the creation of erroneous data. A true display of genealogical relationships should be in a directed acyclic graph, in which the genealogical data cannot be looped or linked back to itself.

In addition, pedigree collapse is another source of trouble for standard pedigree charts. Pedigree collapse occurs when two individuals with a common ancestor reproduce. In effect individuals and/or family groupings can be shown multiple times leading to much confusion when trying to interpret a pedigree chart. Many times, it is difficult to tell if a family grouping is actually a duplicated family grouping or a single family grouping that is being displayed twice. This problem also occurs with the use of an enhanced pedigree display. Furthermore, pedigree collapse also causes a problem in displaying relationship links between two individuals on a pedigree chart. Often times it is necessary to display these relationship links in a textual format as they cannot easily be displayed in a graphical layout.

Therefore it is the objective of the present invention to create a display in which all family data is displayed in a single view. The problems associated with pedigree collapse will no longer exist as this system presents a means to graphically display all family relations and common ancestors, not just direct ancestors. This single view layout allows family relationships to be easily displayed in graphical form. As all family relationships are graphically displayed it is easy to discover and fix any erroneous data that has been entered into the system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15 shows the two other view tabs of the details panel for the highlighted family block in FIG. 9.

DETAIL DESCRIPTIONS OF THE INVENTION

All illustrations of the drawings and description of embodiments are for the purpose of describing selected versions of the present invention and are not intended to limit the scope of the present invention.

Firstly, for an easily understanding of the subject application, the following is a list of terms and their definitions as used throughout this application. An ancestor or direct ancestor is an individual from whom one is descended. The term bloodline is used to identify the maternal and paternal ancestors of an individual. A common ancestor is an individual that two other individuals have in common as a direct ancestor. The term direct line is used to identify the direct maternal or paternal bloodline. An enhanced pedigree display is a method of showing relationship data using a zooming technique. The term family block is used herein to identify the married or unmarried father and mother of one or more children. A family grouping is parents and their child or children, a parent and his or her child or children, a couple with no child. A family tree is a graph used to represent a set of genealogical data by virtue of representing the ancestors of one or more individuals. Genealogical data is data representing individuals, family groupings or event data such as birth dates, death dates, marriage dates, etc. The term home family is used to mark a family block that is the focus of interest. An individual is a single person. A pedigree chart or pedigree tree is a type of display that shows the maternal and paternal ancestors of an individual for the purposes of mapping the individual's contributing bloodline.

The present invention utilizes a recursive algorithm to create a graphical display of genealogical data. All data and family relationships stored in the database are displayed on a two-dimensional graph. Computer software then allows this data to be easily manipulated and used to create different graphical displays of genealogical data as well. The algorithm sorts through imported family data and creates a unique full family graph (FFG). The computer software then allows for a number of unique ways to search, edit and display pertinent family data.

Figure 1:
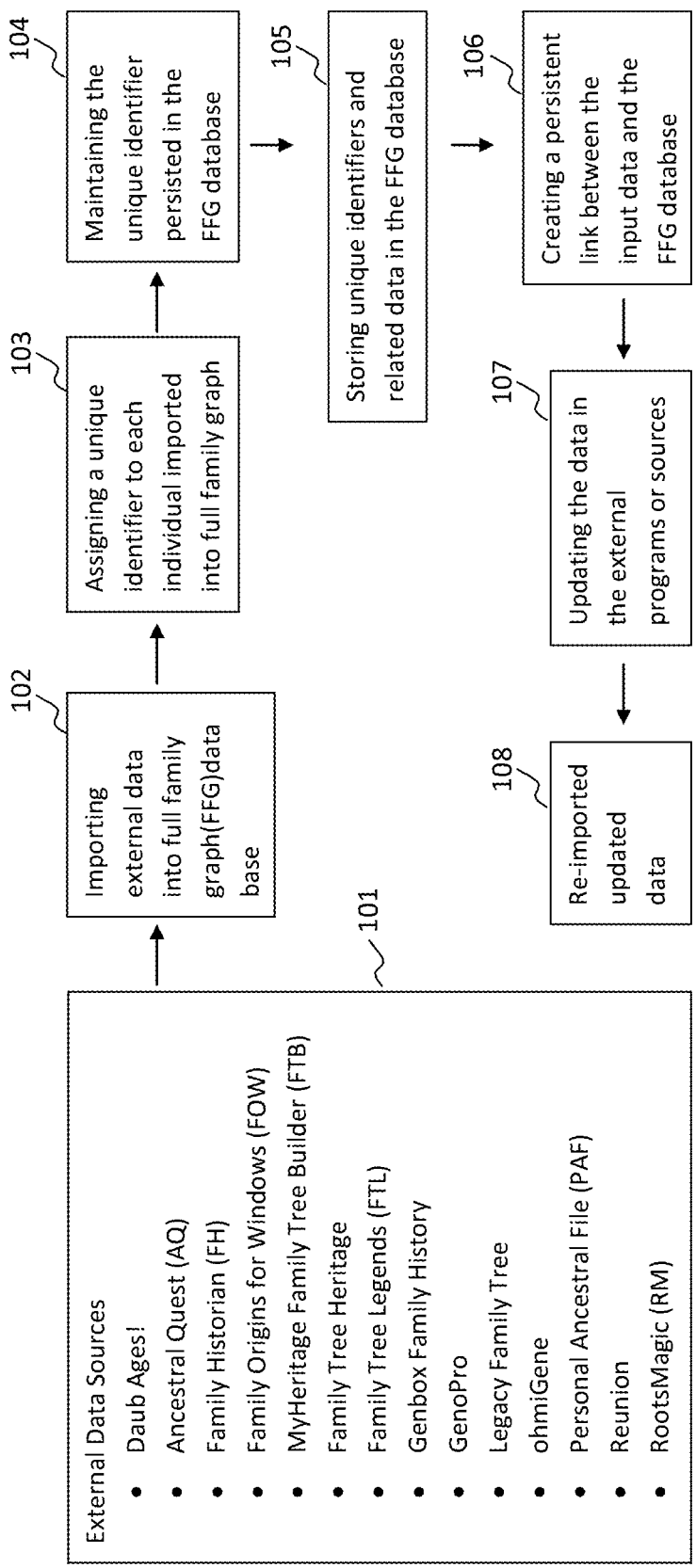
FIG. 1 is a flowchart of how data is imported into the full family graph database.

In reference to FIG. 1, the external genealogical data is first imported into the full family graph (FFG) database 102. This data can come from a number of external sources such as Genealogical Data Communication (GEDCOM), Personal Ancestry File database or a third party application programming interface. In addition, the family data that can be imported is not limited to the aforementioned sources as it is possible that many other sources may be used. The data sources comprise a wide verity of related websites or services 101, such as Daub Ages!, Ancestral Quest (AQ), Family Historian (FH), Family Origins for Windows (FOW), MyHeritage Family Tree Builder (FTB), Family Tree Heritage, Family Tree Legends (FTL), Genbox Family History, GenoPro, Legacy Family Tree, ohmiGene, Personal Ancestral File (PAF), Reunion, RootsMagic (RM), and etc.

When the genealogical data is first imported into the system, a unique identifier is made for each individual and/or each family grouping 103. This unique identifier is usually the Globally Unique Identifier (GUID). But other system or format may also be used in certain circumstances. The system of the present invention will attempt to detect and carry over any previous Ancestry File Number or GEDCOM unique identifier to maintain the unique identifier persisted in the entire full family graph database 104. Therefore, the unique identifiers and the related family data will be stored in the FFG database 105. By persisting unique identifiers into the full family graph database it creates a persistent link between the external data and the FFG database 106. In this way, it allows data to be updated in an external program 107 and then re-imported into the FFG database 108 without causing any data to be overwritten or lost.

Once all data has been imported into the full family graph database it is then formatted to create the full family graph. The full family graph can be saved and exported in a number of forms including but not limited to the Portable Document Format (pdf), document (doc), Office Open XML (docx), Joint Photographic Experts Group (jpeg), and so on. Additionally, it is also possible to print a hard copy of the full family graph.

The data that is imported into the full family graph database is first organized into family blocks. A family block is used to represent any of the following: 1) two married individuals, 2) an individual with an unknown spouse that has one or more children, or 3) an unmarried individual. Individuals that have children with more than one partner or are married to more than one partner may belong to more than one family block. Family blocks are created for each parent or set of parents listed in all family grouping records. This is done by analyzing both individuals and family groupings and their relationship links. First, family grouping records are used to create a family block for each parent or set of parents. Then family blocks are created for each child in a family grouping that is not already listed as a parent in another family grouping. Finally, family blocks are created for all individuals that are not found as a parent or child in a family grouping. Each family grouping in the full family graph database is displayed only once on the full family graph.

Figure 2:
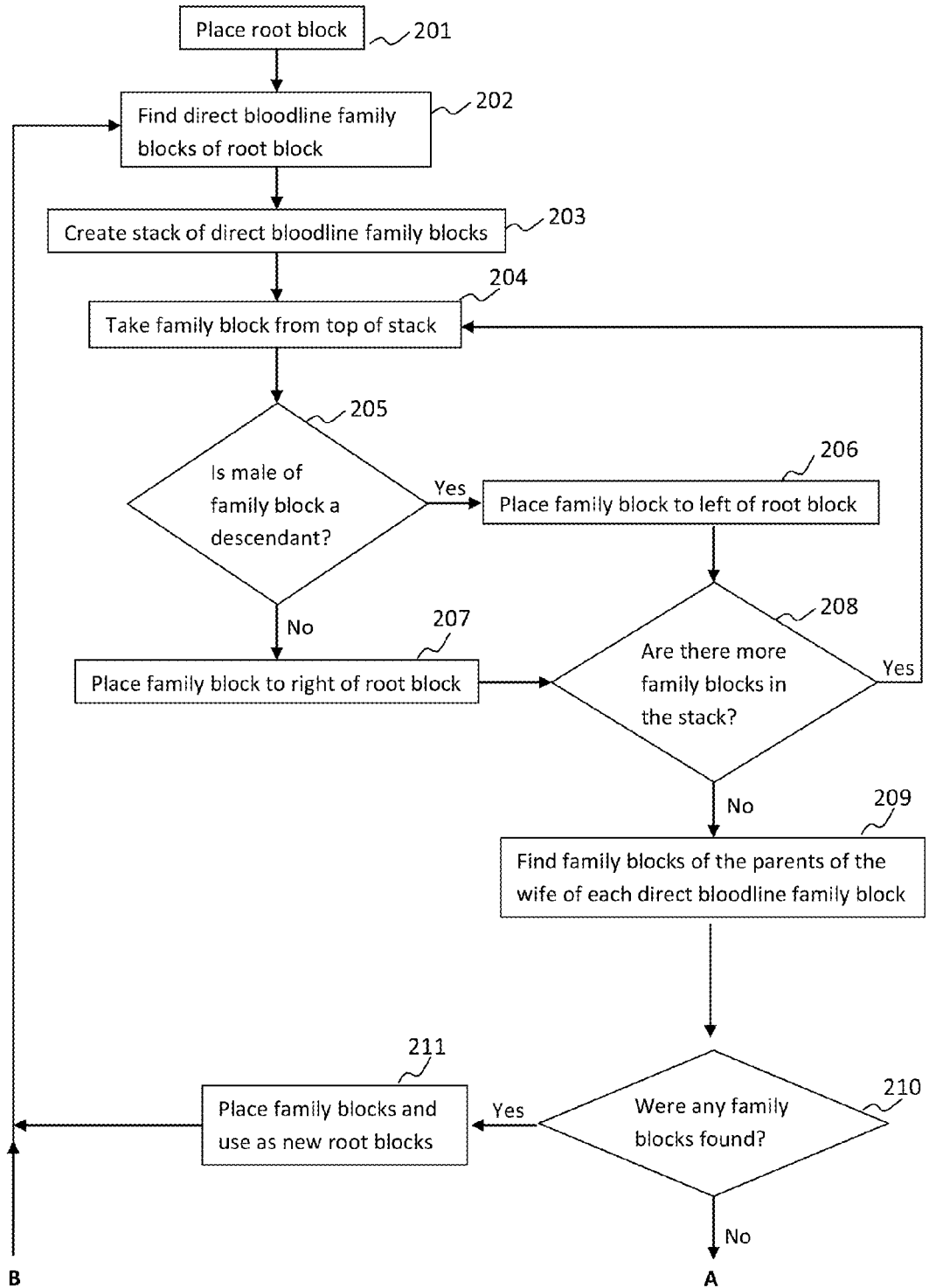
FIG. 2 is part of a flowchart of the algorithm to create the full family graph.
Figure 3:
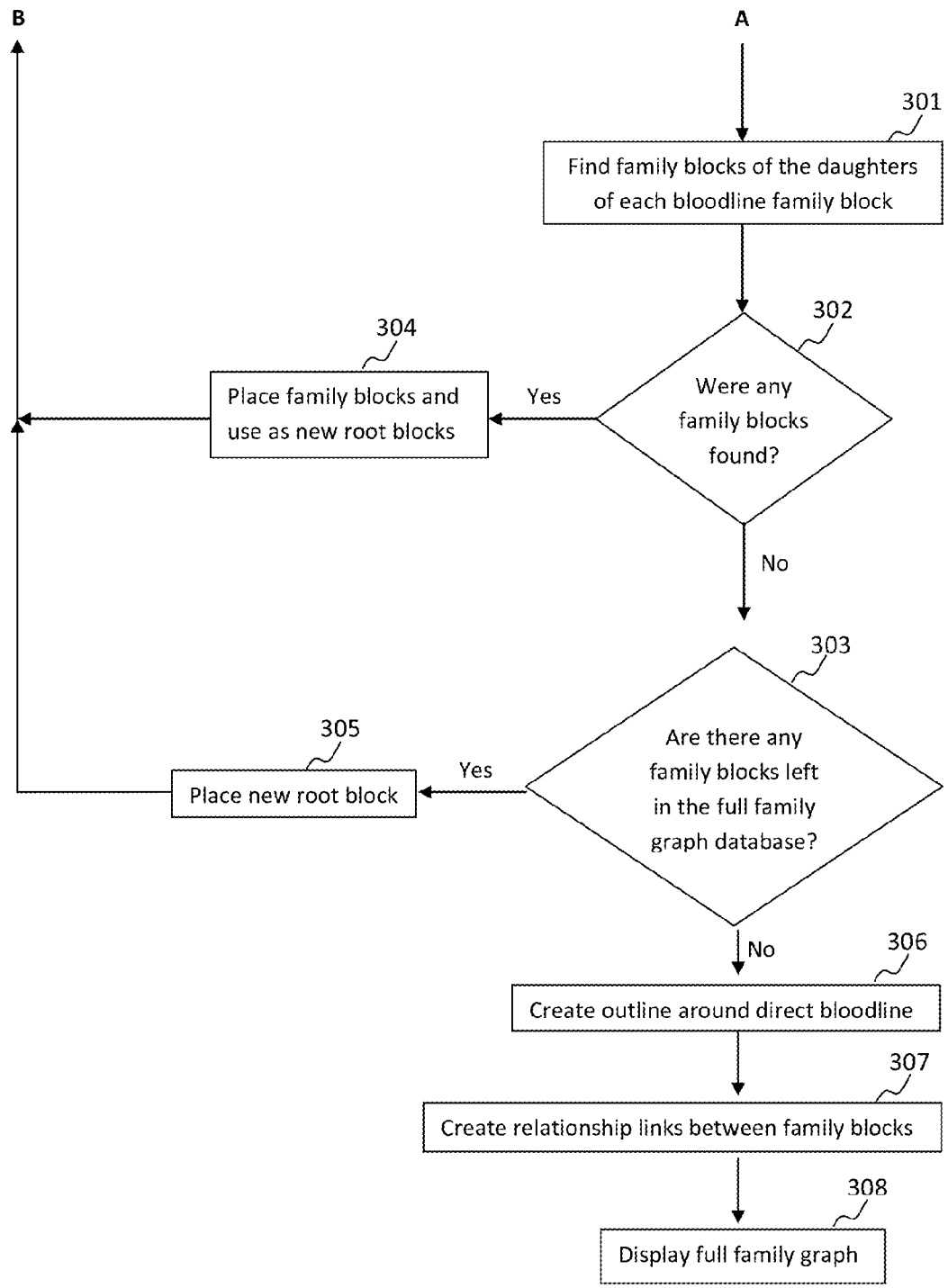
FIG. 3 is the continuation of the flowchart from FIG. 2.
Figure 4:
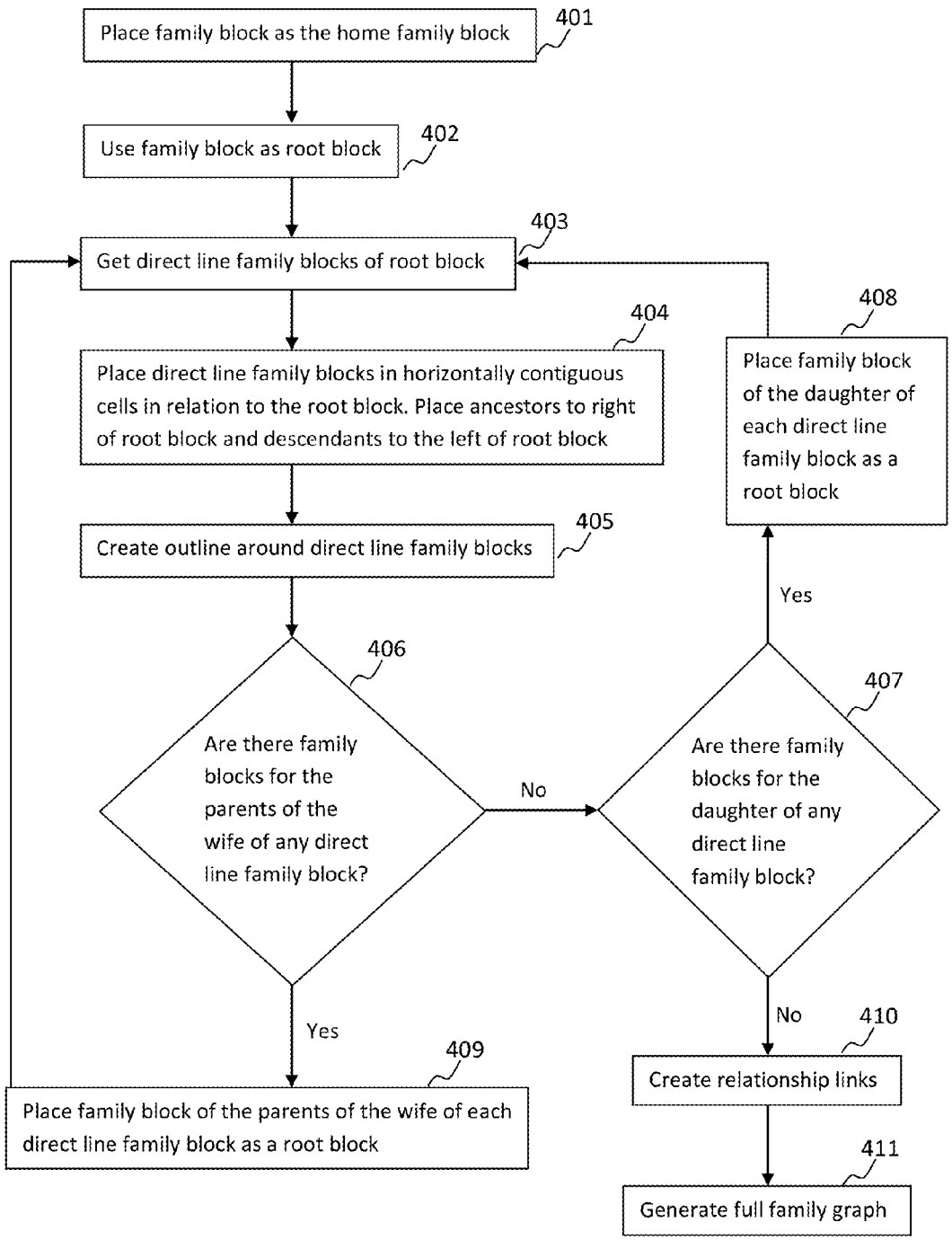
FIG. 4 is an alternative way of flowchart to demonstrate the algorithm to create the full family graph.
Figure 5:
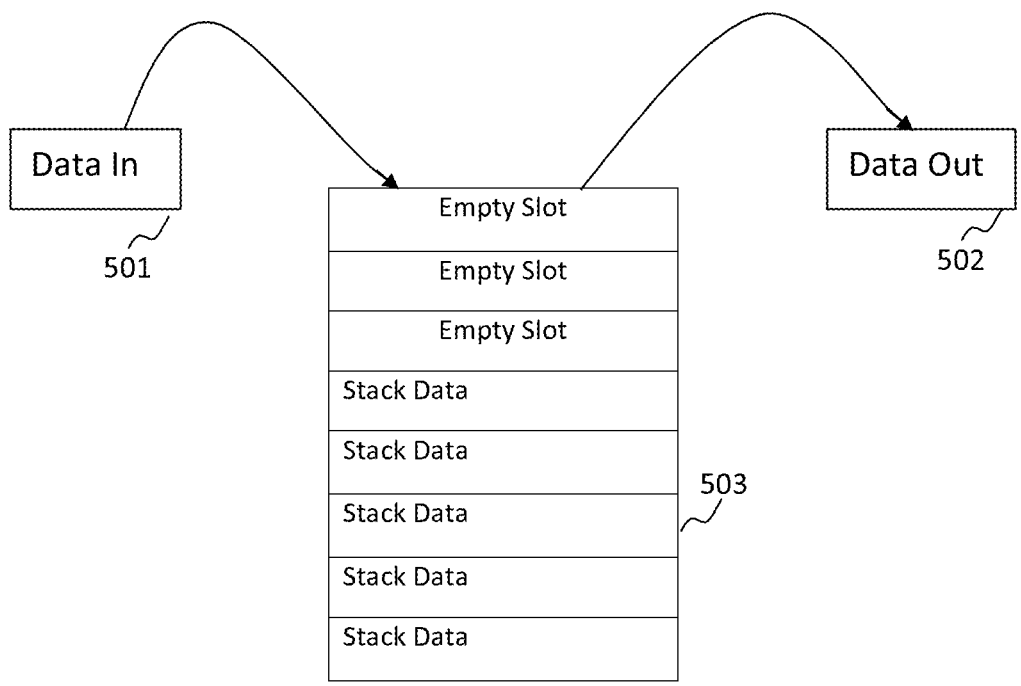
FIG. 5 shows how stack data is stored and used.
Figure 6:
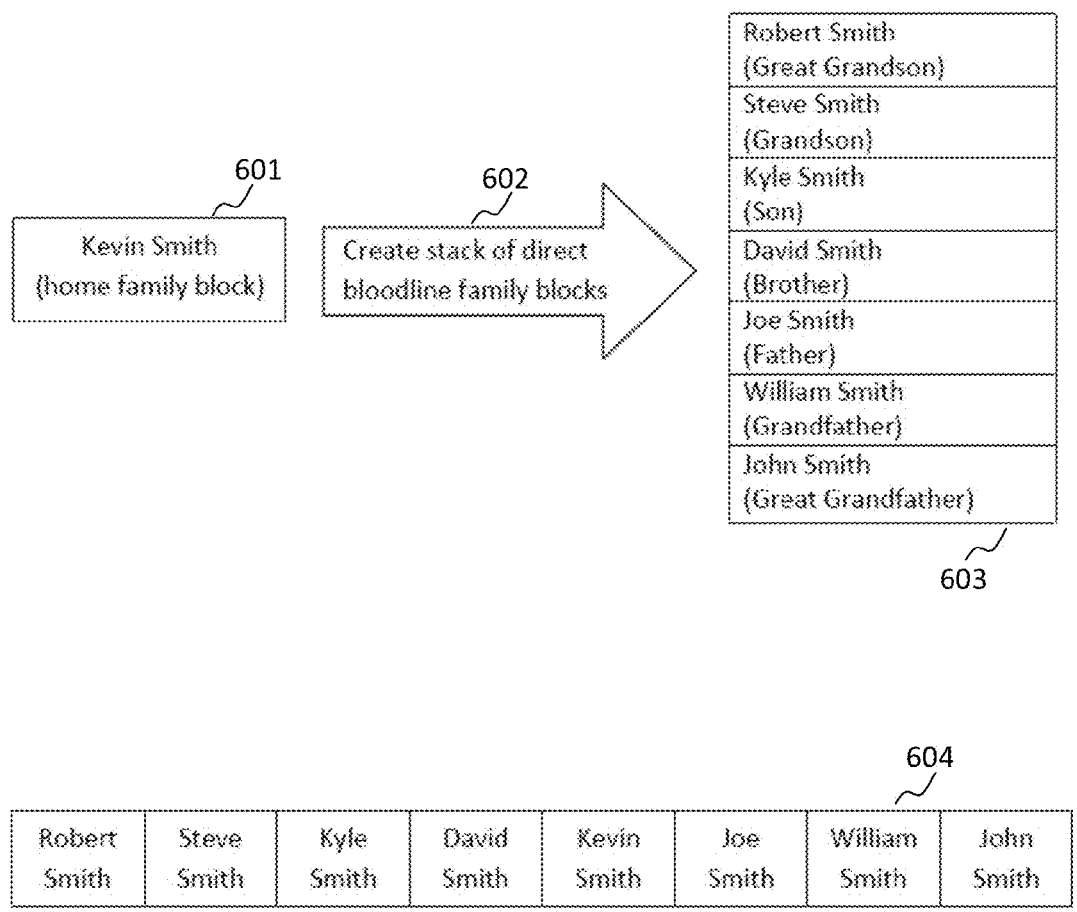
FIG. 6 shows the stack for the direct bloodline family blocks of a home block family and the ordered direct bloodline.

In reference to FIGS. 2-4, the approach to create the full family graph is started by selecting or placing a home family block, or root block 201. The home family block can either be automatically chosen by the software or manually chosen by the user. In reference to FIGS. 5-6, a stack containing the family blocks 602 of the direct bloodline of the home family block 601 is then created. This may goes to multiple generations 603, 604. The input data 501 is from the FFG database, and the processed data of multiple stack data 503 will be sent out 502 for building the full family graph. In this way, the direct bloodline family blocks of the home or root block have been identified 202.

Once the home family block has been placed and the stack of direct bloodline family blocks have been created 203, the rest of the direct bloodline family blocks are called from the stack and are then placed accordingly 204. The next step is to determine whether the male of that family block is a descendant 205. If yes, then place this family block to left of the root block 206. While, if the answer is no, then place this family block to right of the root block. After the first family block has been finished, the procedure will go to the next step and determine whether there are more family blocks in the stack 208. If there is more family block in the stack, then returns back to the step 204 to take it from the family block stack for the similar processing. Until there is no more family blocks in the stack. When all of the family blocks in the stack have been processed, the genealogical data related to the wife of each family will be incorporated into the full family graph. Firstly, find family blocks of the parents of the wife of each direct bloodline family block 209, and determine if there is any such kind of family block 210. In the case when the answer is yes, then used it as a new root block 211 to generate a new bloodline family blocks starting from the step 202. If the answer is no, then goes to the next step.

Following the above procedures have been finished, the next step would be try to find the family blocks of the draughts of each bloodline family blocks 301. If there is such a family block of the daughter has been found, then place that family block and used it as a new root block 304 to generate a new bloodline with the related family blocks. When these steps have been finished, find if there is any family block left in the full family graph database 303. Similarly, if there is any such remaining family block, place it as a new root block 305.

Next, outlines have been created around each bloodline 306. And then create relationship lines between each family block 307. And display the generated full family graph in various aforementioned ways 308.

The foregoing procedure for generating a full family graph has been demonstrated in the steps 401 to 411 in FIG. 4 in another illustration way. More specifically, in the generated full family graph, the male ancestor blocks are placed in horizontally contiguous cells to the right of the home family block, while male descendants are placed in horizontally contiguous cells to the left of the home family block. An outline is created for each direct bloodline on the full family display. The parents of the wife of each direct line family block is then placed at least one cell to the right and at least one cell below the family block of the wife. The family block of the parents of the wife is then used as a root block to create a new direct bloodline. The daughters of each direct family line are then placed one cell to the left and at least one cell above 801 the parents' family block. Each daughter family block is then used as a root block to create a new direct bloodline.

Figure 7:
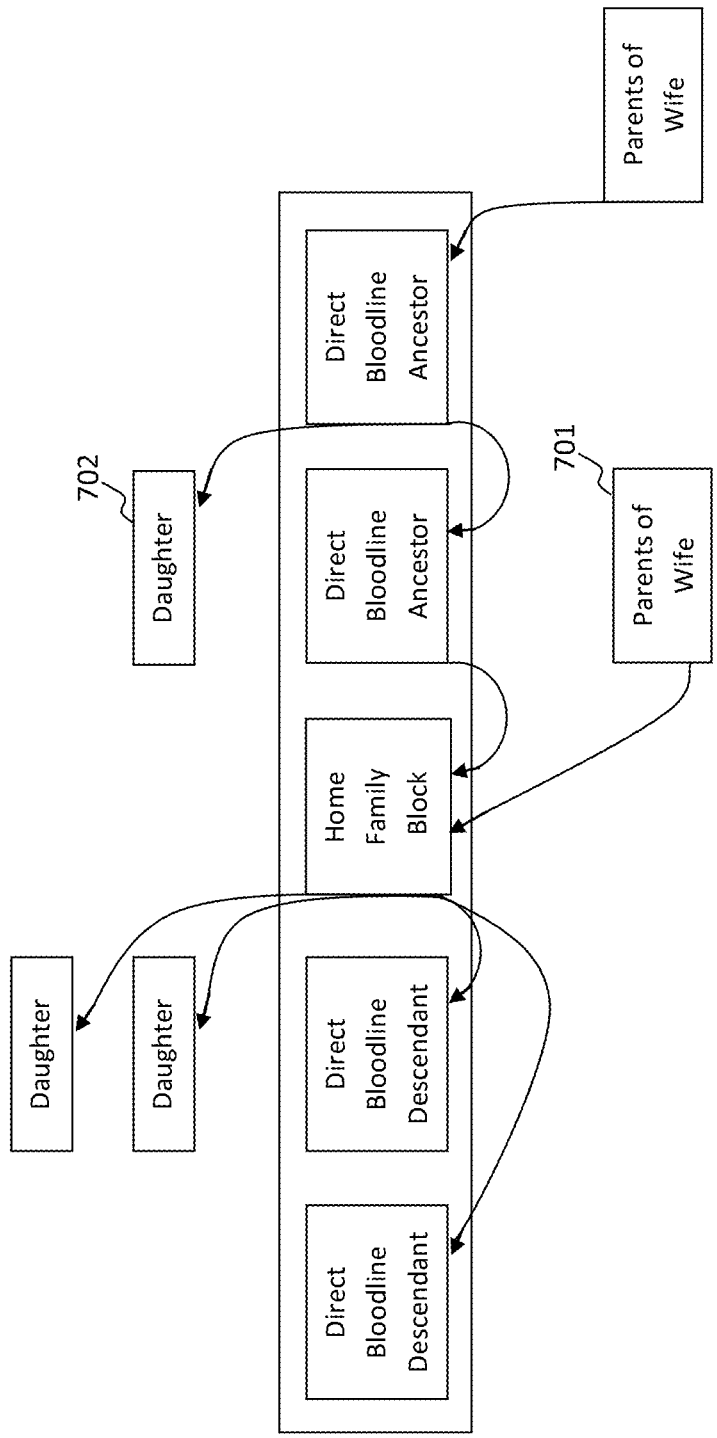
FIG. 7 shows the basic ordering and placement of family blocks on the full family graph for a direct paternal bloodline.

The algorithm takes into consideration of adoptions, duplicate individuals, duplicate family groupings, and inaccurate or missing birth dates. All data that is stored in the full family graph database will be displayed in the full family graph, including erroneous data. It is also possible that unlinked data be processed and displayed as well. If a family block has no common descent with any other family groupings then a new graph is generated for that data. These multiple full family graphs can then be displayed either separately or together. This process is repeated until all blocks have been placed. In FIG. 7, it shows an example of the graphical layout for a full family graph based on a direct paternal bloodline 701 of the home family block 702. The direct bloodline is created first and then subsequent family blocks, such as 703 and 704, etc are positioned around the direct bloodline.

Once all blocks have been placed, relationship links are then created between each family block shown. These relationship links are represented by curved, colored lines between parent and child blocks. In the preferred embodiment of the present invention, male descendants are marked by a blue line with an arrow pointing to the son, while female descendants are marked by a pink line with an arrow pointing to the daughter. The software allows the user to change the color of these relationship links. Furthermore, the lines can be solid or dashed. Solid lines are used to display primary relationships, while dashed lines are used for all other relationships, such as adoptions. The relationship links allow users to more readily notice cyclic errors stored in the full family graph. Users can look for the graphical display of these circular errors from the main display, which is much easier than searching through a textual display of information.

Based on the foregoing information, the full family graph is build up by firstly placing a root block in the full family graph to be built. Then try to find the direct bloodline family blocks of the root block in said full family graph database; creating a stack of direct bloodline family blocks of said root block. Following the stack has been filled, organize the direct bloodline family blocks in the stack by a pre-determined order based on genealogical information about a male member in each direct bloodline family block in said full family graph database; and then build the full family graph by adding each family block from said stack in said predetermined order.

Following the building work with the root block, the branch with the wife of the placed family blocks will be initiated to establish. First identify a wife member of each one of the direct bloodline family blocks; then using each family block comprising the parents (or one side of the parents when the spouse is unknown) of the identified wife member 701 as the new root block. And finally, position each family block comprising parents of the identified wife member below a family block comprising the corresponding wife member. It should be noted here that 'positioning' is done such that the parents of the new branch are located at a suitable position, which is as close to their daughter as possible. In addition, the family blocks in the newly created branch(s) do not overlap any currently placed family blocks.

Next, the branch with the daughter(s) of the placed family blocks will be created. First identify a daughter of each one of said direct bloodline family blocks; and next use each family block comprising the daughter 702 as a new root block. And finally place each family block comprising the daughter above a family block comprising the corresponding parents of the daughter. And again, It should be noted here that 'positioning' is done such that the daughter of the new branch is located at a suitable position, which is as close to her parents as possible. In addition, the family blocks in the newly created branch(s) do not overlap any currently placed family blocks.

Following placing each family block into the full family graph, certain relationship indicators will be set up between the family blocks in this full family graph. First, an outline 802 around each direct bloodline will be generated with a color band (such as purple), and then add the respective relationship links between family blocks. Represent relationships in the full family graph with curved and colored lines between a family block comprising parents and a family block comprising a child. Marking a male descendant by a line of color two 803; marking a female descendant by a line of color three 804. As for these various colored curved lines, they always point an arrow toward the descendent. The primary relationship is with a solid line; and the relationships other than primary relationship are represented by a dashed line. Herein the relationships other than primary relationship comprise the adoption.

As for the family blocks in each direct bloodline, they will be organized by a pre-determined order according to the male member of the family block. There are various ways to make the organization in order. What's been disclosed herein is only a few exemplary embodiments and they are not intended to limit the scope of the present invention. For example, the order can be made as positioning a male of an older generation on right of his immediate younger generation and positioning a male of a younger generation on left of his immediate older generation.

Moreover, there are various possible organization orders (pre-set orders) between different male siblings. For instances, the male brothers could be ordered based on their ages. The older brother would be placed at the right of the younger ones; or the male brothers could be ordered based on their first names (given names), which could be organized in an alphabetical order. There would be many other ways to handle such organization, such as ordering the male brothers base on how many children they have. The brother with the most children will be placed at the far left and the brother with fewest children (including no children) will be placed to the far right. In addition, the user will be allowed to select a type of order by himself/herself.

There are also a number of other options that the algorithm allows for in the display of the full family graph. The following are some examples of these options and are not intended to limit the scope of other options that may be made available. The spacing of the family blocks in relation to one another can be changed based on user input. In addition, the size of each family block can be chosen based on user input, as well as its shape. In turn, the determined size of each family block is then used to create the size of cell locations for placement of the family blocks. In the preferred embodiment of the present invention direct lines are constructed on a paternal basis, meaning that all males of the same paternal bloodline are placed on the same direct line. The direct line can also be set to be constructed on a maternal basis. The algorithm also allows the user to choose the number of generations of descendants and ancestors that they wish to be displayed. The algorithm also allows the user or controlling software to identify a subset of related family blocks to display. These options will allow users to create a graph that is best sized for their needs. Furthermore, the algorithm allows for mirrored versions of the graph to be created. These mirrored versions can be made in the x direction, y direction or both x and y directions.

Figure 8:
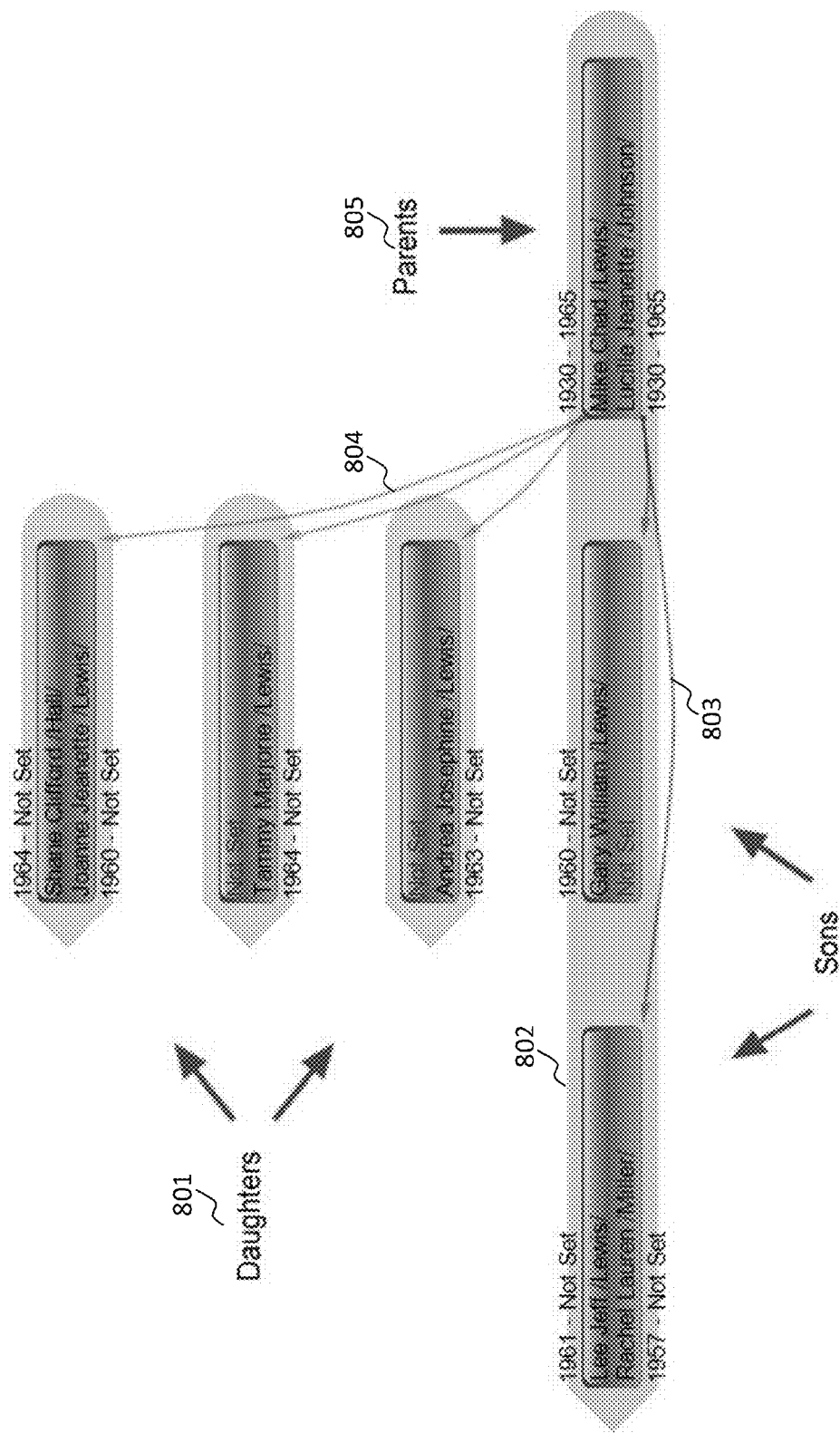
FIG. 8 is a view of a sample of the full family graph layout, showing the descendants of a chosen family block.
Figure 9:
FIG. 9 is a display of the full family graph layout featuring family blocks, direct bloodlines and relationship links.

In reference to FIGS. 8 and 9, a small sample of the full family graph is displayed in FIG. 8. The parents are located in the family block to the far right 805. Family blocks containing male descendants are then placed in the first available cell to the left of the parent. Family blocks containing female descendants 801 are then placed one cell to the left and at least one cell above the parent family block. Blue lines and arrows 803 are used to show male relationships and pink lines and arrows 804 are used to show female relationships. FIG. 9 shows a view of a complete full family graph. Direct male bloodlines are outlined in purple 802 and all family blocks are shown with their respective relationship links. The full family graph created is unique to the chosen home family block 901. The full family graph still shows all of the information in the database for any chosen home block family. However, the arrangement and overall display of the data varies as the structure of the full family graph is built around one family block. Relationship links are also redrawn depending on the selected home family.

Figure 10:
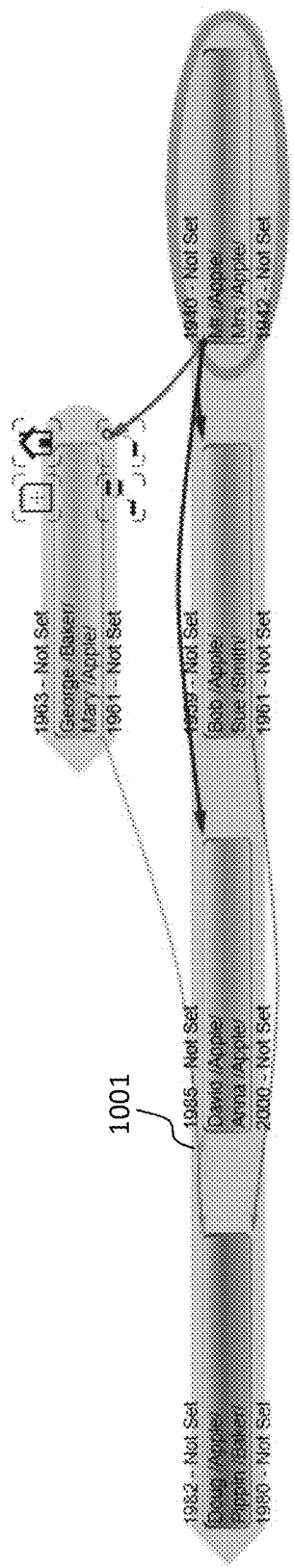
FIG. 10 shows a case of pedigree collapse represented by the full family graph.

In reference to FIG. 10, a sample of data is displayed to show how the full family graph represents pedigree collapse. The family block to the far right contains the parents Mr. and Mrs. Apple. They have two sons Bob and David whose family blocks are located to the left of the family block for Mr. and Mrs. Apple, along the direct bloodline. They also have a daughter Mary whose family block is located one cell above and to the left of the family block for Mr. and Mrs. Apple. Bob and his wife have a son Doug who marries the daughter Pippin of Mary and her husband. The family block for Doug and Pippin is located to the far left and is on the direct bloodline, as Doug is a male descendant of Bob. In turn, Doug and Pippin have a daughter Anna who is married to David. The nature of the full family graph allows cases of pedigree collapse 1001 to be shown without the need to show duplicated family blocks or individuals. In addition, each family block relationship can easily be seen by following the relationship links.

Figure 11:
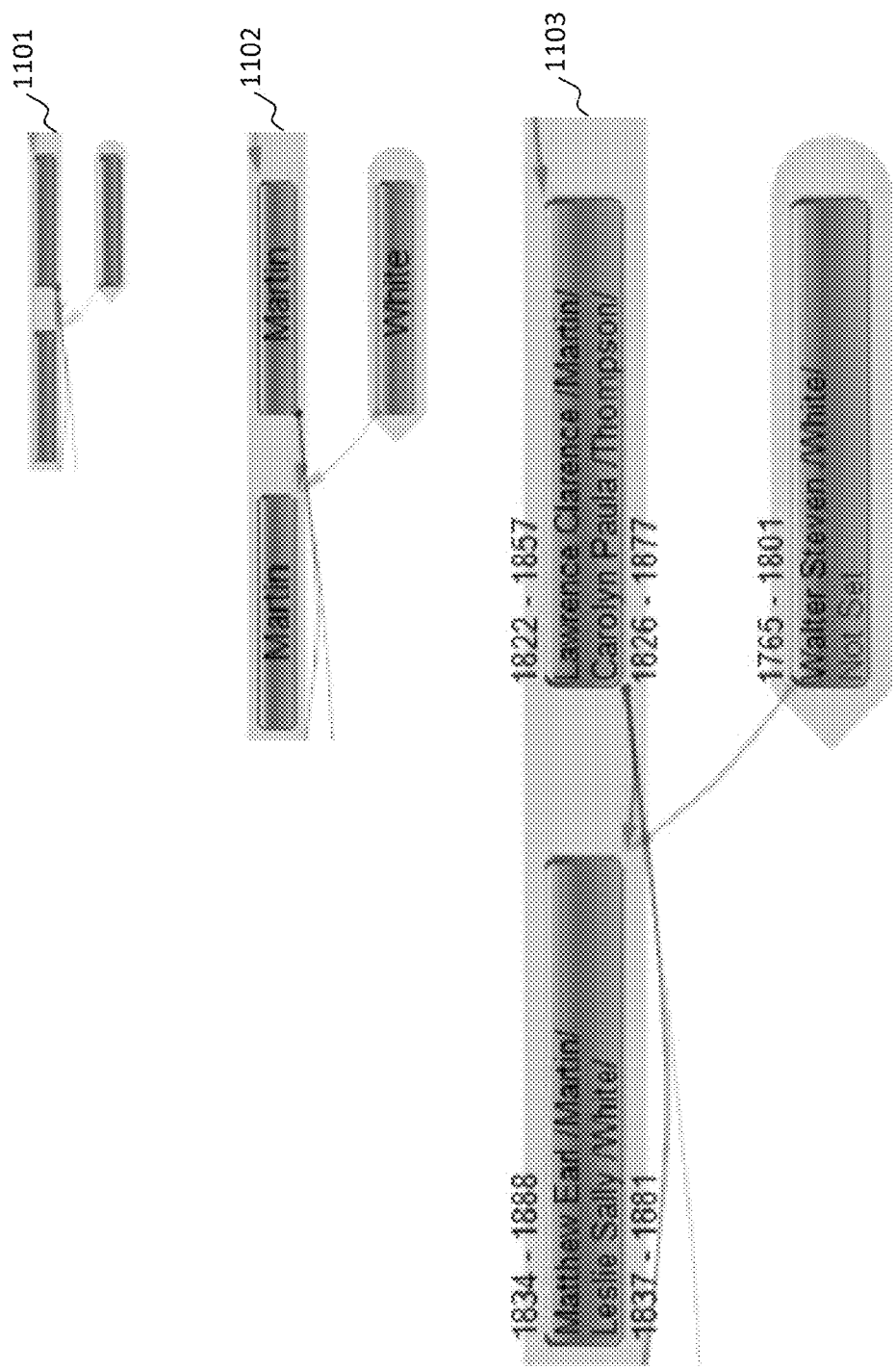
FIG. 11 is a display of the various levels of zoom on the full family graph.

In reference to FIG. 11, a family block contains and displays the information obtained from the family block definition. The amount of information displayed by a family block is dependent upon the zoom level of the graph. The overall display of the graph remains the same throughout each level of zoom. In the furthest zoomed out view 1101 each family block is represented by a rectangular block with no information other than the lines defining relationship links. At the next zoomed in level 1102 each family block is represented by a rectangular block with the surname of the male. If there is no male then the surname of the female is shown. This provides a summarized view of direct line relationships, which is a convenient way of reviewing pedigree collapse. The third level is the most zoomed in view 1103 of the full family graph in the third level of zoom each family block consists of a rectangular block, the full name of each parent and the birth and death date of each parent.

Figure 12:
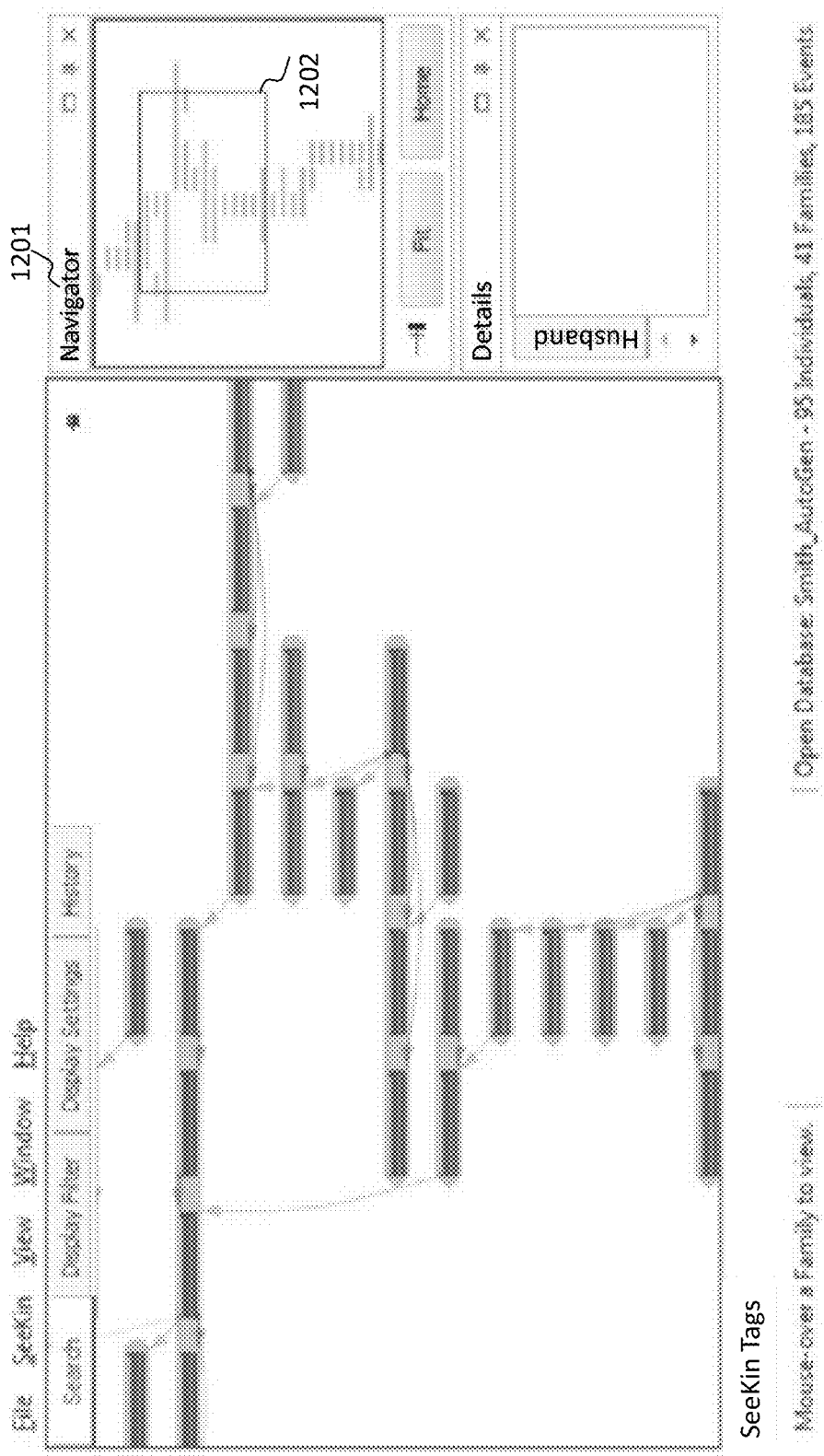
FIG. 12 shows the main display of the full family graph with the navigator.
Figure 13:
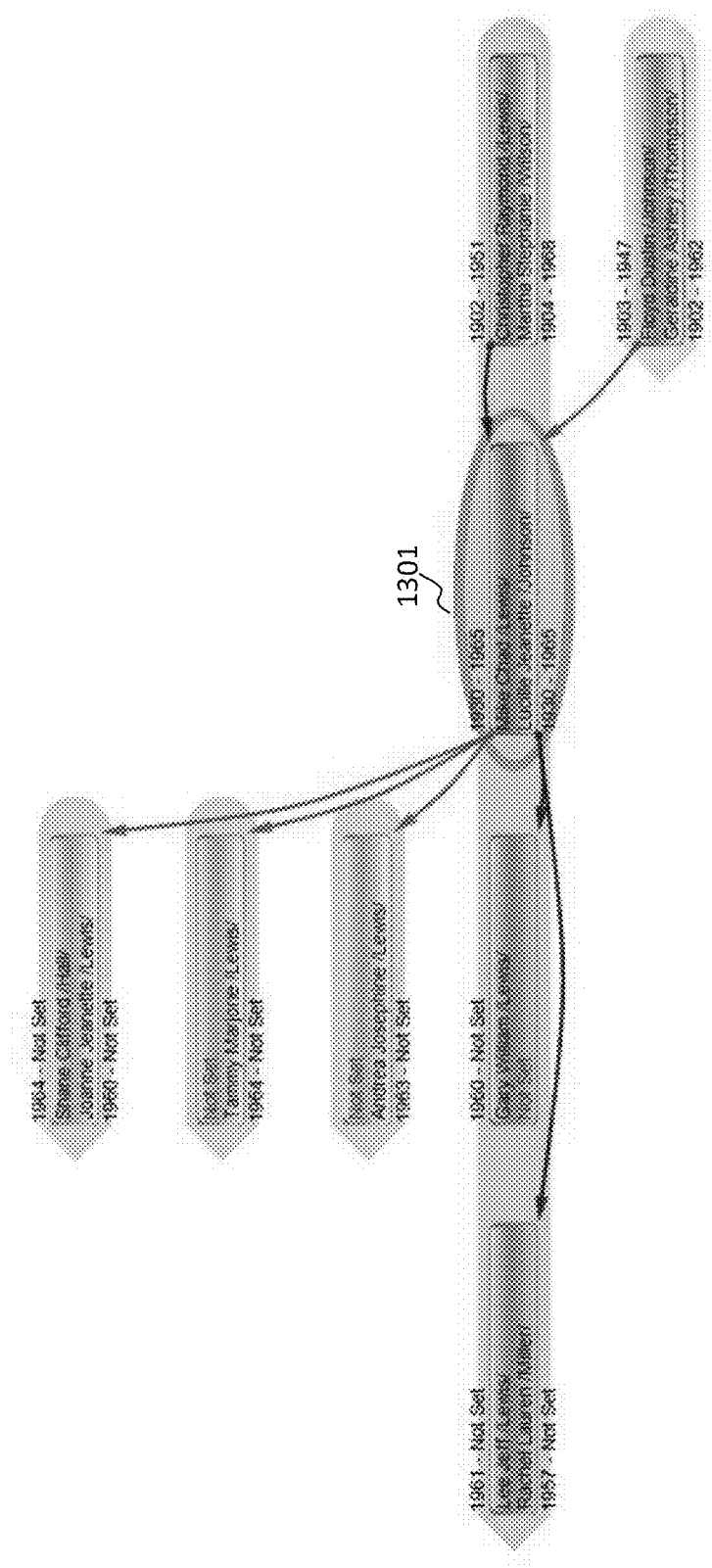
FIG. 13 shows the highlighting feature of the present invention.

In reference to FIGS. 12 and 13, as the display of information shown in a full family graph can be quite large, there are several features that allow for the easy navigation of the graph. The main display of the full family graph allows the user to utilize pan and zoom mouse commands in order to pinpoint specific locations of the full family graph. The pan feature allows a user to click and drag on the map in order to change the area of focus on the full family graph. The zoom features are those mentioned in the above paragraph. A navigator 1201 is also incorporated into the software that allows the user to view the full extent of the full family graph in a smaller window. The navigator is a separate display shown to the right of the main display of the full family graph. The navigator is further comprised of a highlighted box that indicates to the user the section of the full family graph that is currently being viewed 1202 on the main display.

To further assist in the understanding of the graphical layout, the software utilizes a highlighting system that varies based on the selected family block. When a family block is selected by either clicking on it or hovering the mouse cursor over it, the direct family lineages of the individuals within the family block are highlighted 1301. In addition the relationship lines and arrows are changed in order to represent relationship links to the selected family block. This system of highlighting makes it easier to visually detect errors in data such as loops or incorrect relationships. In the preferred embodiment of the present invention male children are highlighted in blue, female children are highlighted in pink, parents of the father are highlighted in blue and yellow and parents of the mother are highlighted in pink and yellow, other ancestors of the father are highlighted in blue and other ancestors of the mother are highlighted in pink. It is possible for users to change the colors used in highlighting.

Figure 14:
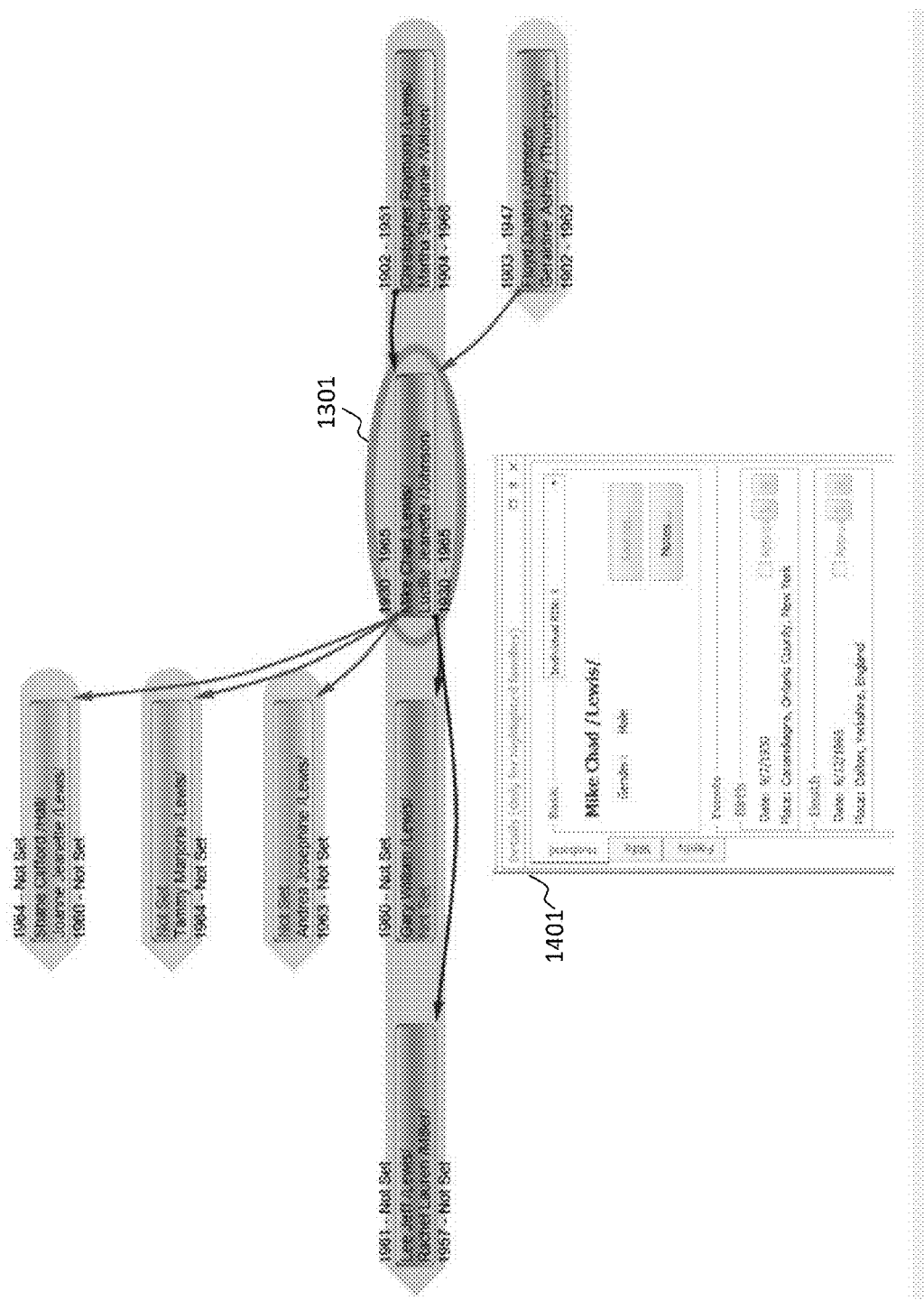
FIG. 14 shows a highlighted family block and a view of the details panel for said highlighted block.
Figure 15:
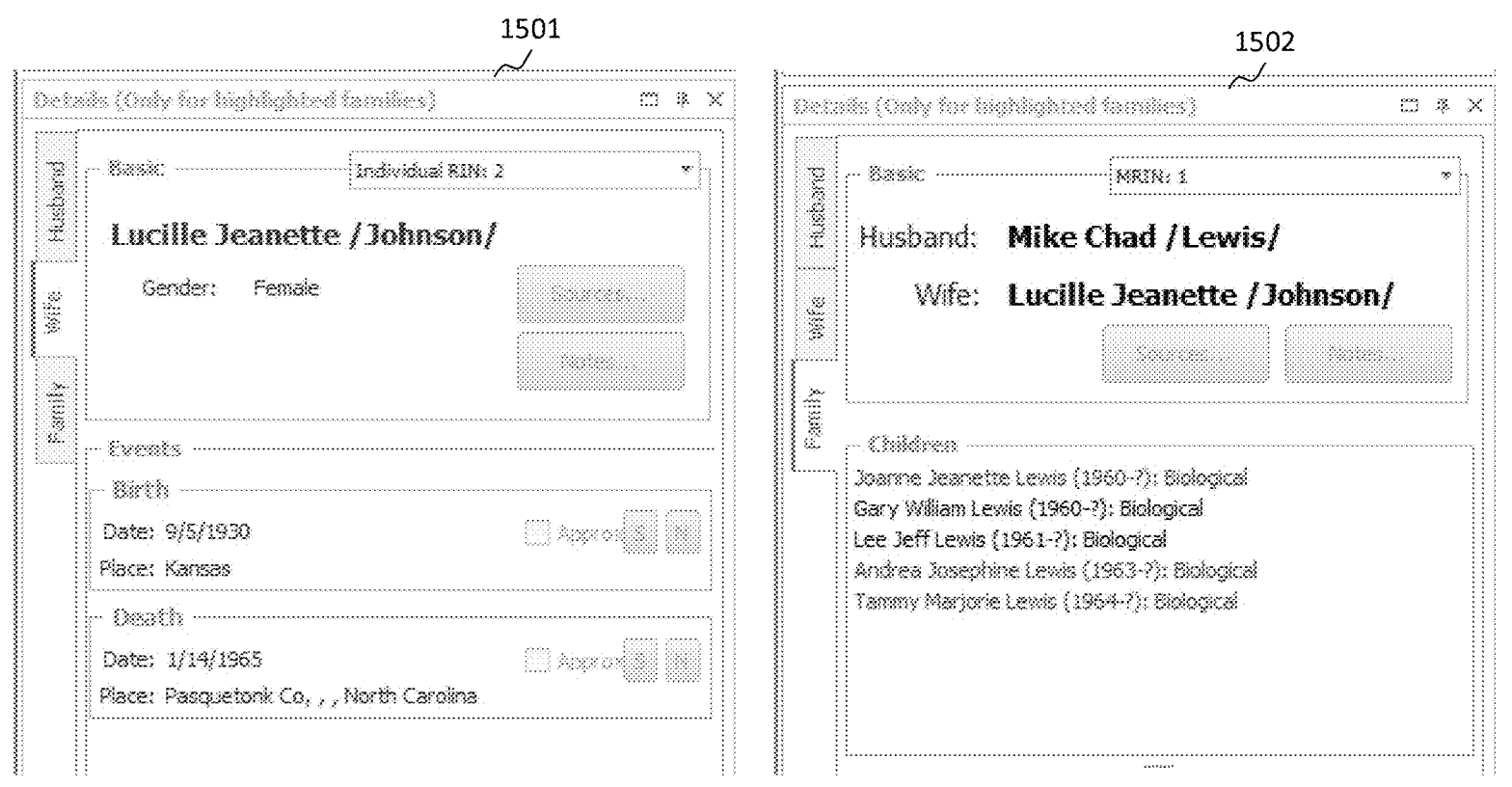
Figure 16:
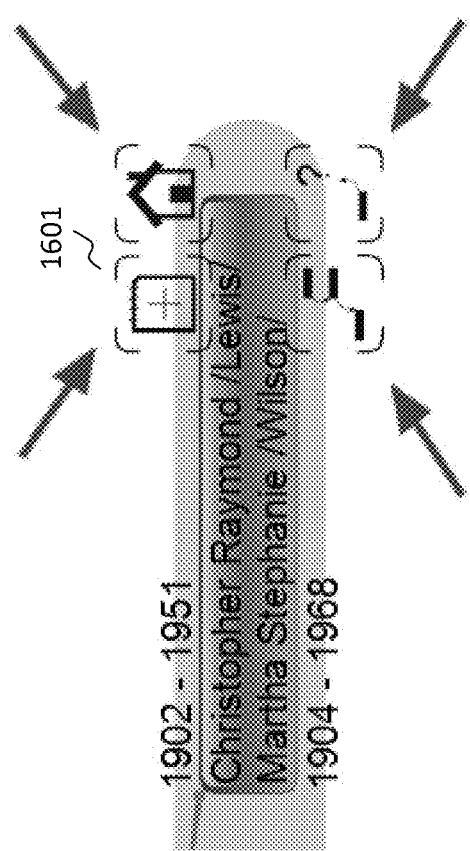
FIG. 16 shows the display of family block commands available when a user hovers the mouse over a family block.

In reference to FIGS. 14-16, the graphical nature of the full family graph also allows for point and click editing of data. Rather than having to switch from one window or dialog to another, users can add, delete or edit data right from the main display. By hovering over a family block with the mouse a user can view detailed data of the family block in the details panel. The details panel is comprised of three tabs 1401, 1501, 1502 that can be selected to view detailed information of either, the husband, wife or family. The detailed information displayed includes, but is not limited to, names, dates and event information. In addition to displaying detailed information in the details panel, while hovering over a family block, icons are displayed around the block itself 1601. These icons allow certain operations to be performed on the family block. These operations include, but are not limited to, setting the home family, adding a tag and finding the relationship to the home family. Only pertinent operations are displayed. For example if a family block is already set as the home family then an icon to set the home family or find a relationship to the home family will not be displayed.

Figure 17A:
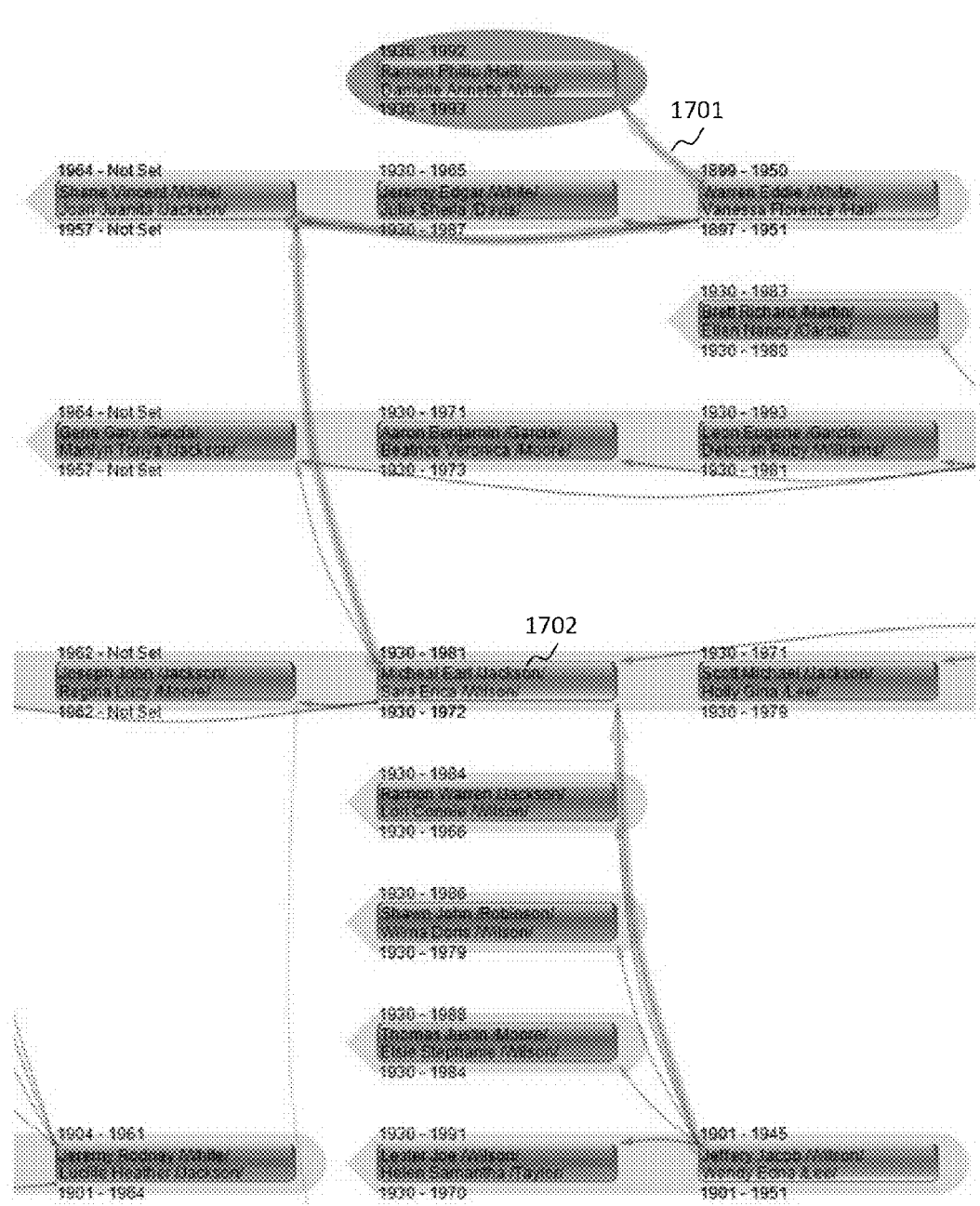
FIG. 17a shows the use of the relationship finder function.
Figure 17B:
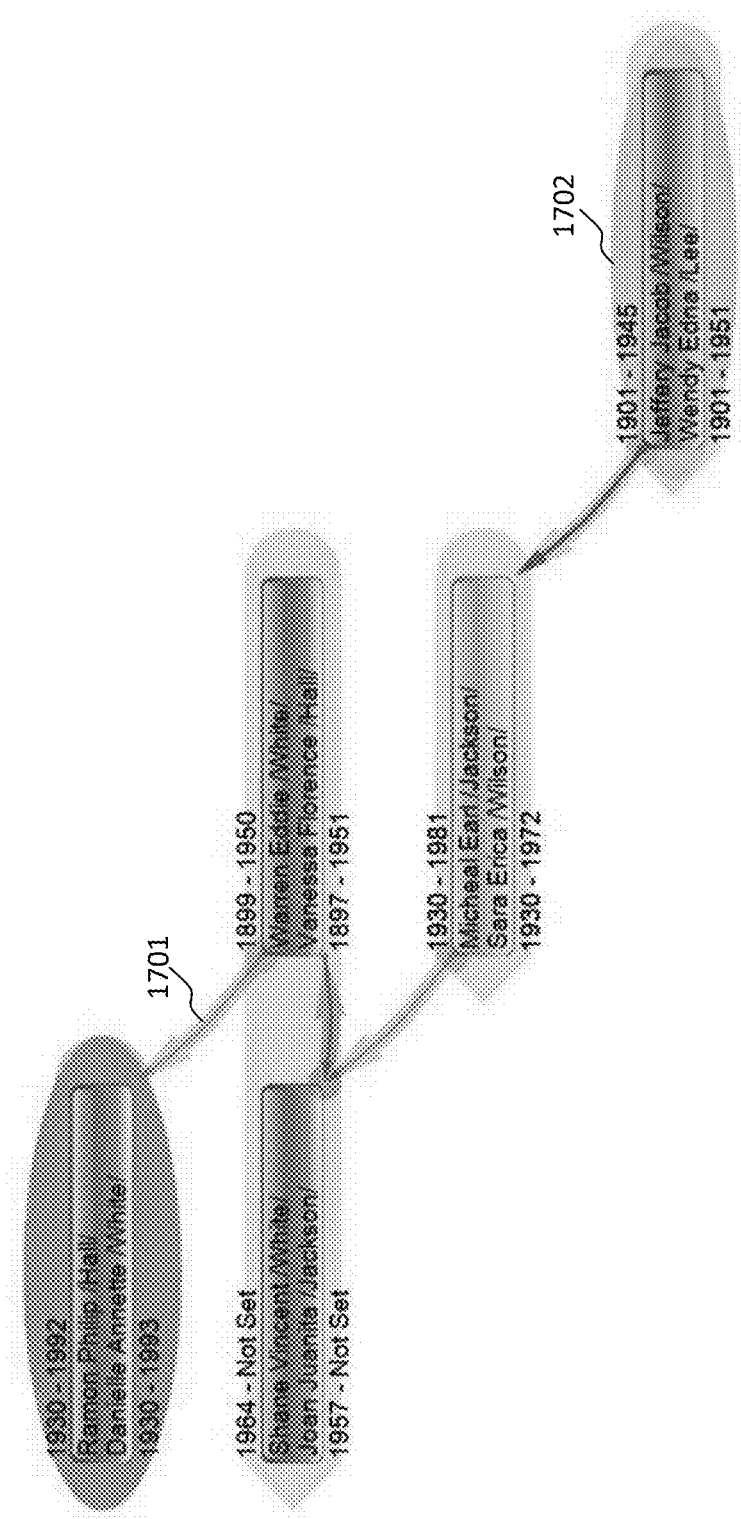
FIG. 17b shows the same relationship display as FIG. 17a but only displays the family blocks included in the relationships

As shown in FIG. 17*a* and FIG. 17*b*, FIG. 17*a* shows the relationship finder. FIG. 17*b* shows the same relationship display but only displays the family blocks included in the relationships. In other words, the family blocks not part of the relationship chain are not displayed. Note that the same family block placement rules apply. The home family icon allows a family block to be set as the home family. When a new family block is selected as the home family, the full family graph is recreated to center around the chosen family block. The full family graph still shows all of the data in the full family graph database but the relationships shown are in reference to the selected home family.

By clicking the relationship finder icon, the relationship between the family block and the home family is highlighted, as can be seen in FIG. 17*a*. The highlighted path is made from the existing relationship links, however, the lines and arrows are made to be bolded and brighter 1701. Also each family block that contributes to the path is highlighted 1702. All pertinent relationship links and family blocks are highlighted to show the path of relationship through the full family graph. This allows users to see relationships in a graphical nature as opposed to viewing relationships in a textual manner. It is also possible to show relationships between two family blocks that are not the home family.

The tag icon allows the user to tag a family block with a SeeKin tag that is stored within the full family graph database. SeeKin tags can be created by either the user or the software. They are used to create notes and other information pertaining to one or more family blocks and relationship links. A typical SeeKin tag is comprised of a list of family blocks and their relationship links, title field, summary field, note field, type name, priority number field and status field. There is a SeeKin tags display panel, which allows users to filter and view tags in the database, as well as change the tag priority, status and notes. Tags can be created, deleted or modified by selecting them in the SeeKin tags display panel. When a tag is first selected, the home family block is set to the first family block identified by the tag. The other related family blocks and their relationship links are highlighted in the main display of the full family graph. This allows multiple relationships link to be highlighted at a single time. The highlighting of relationship links functions in the same manner as the relationship finder. The software contains algorithms to check for errors and warnings and create SeeKin tags for said error and warning data. This allows a user to easily locate and fix incorrect data.

Figure 18:
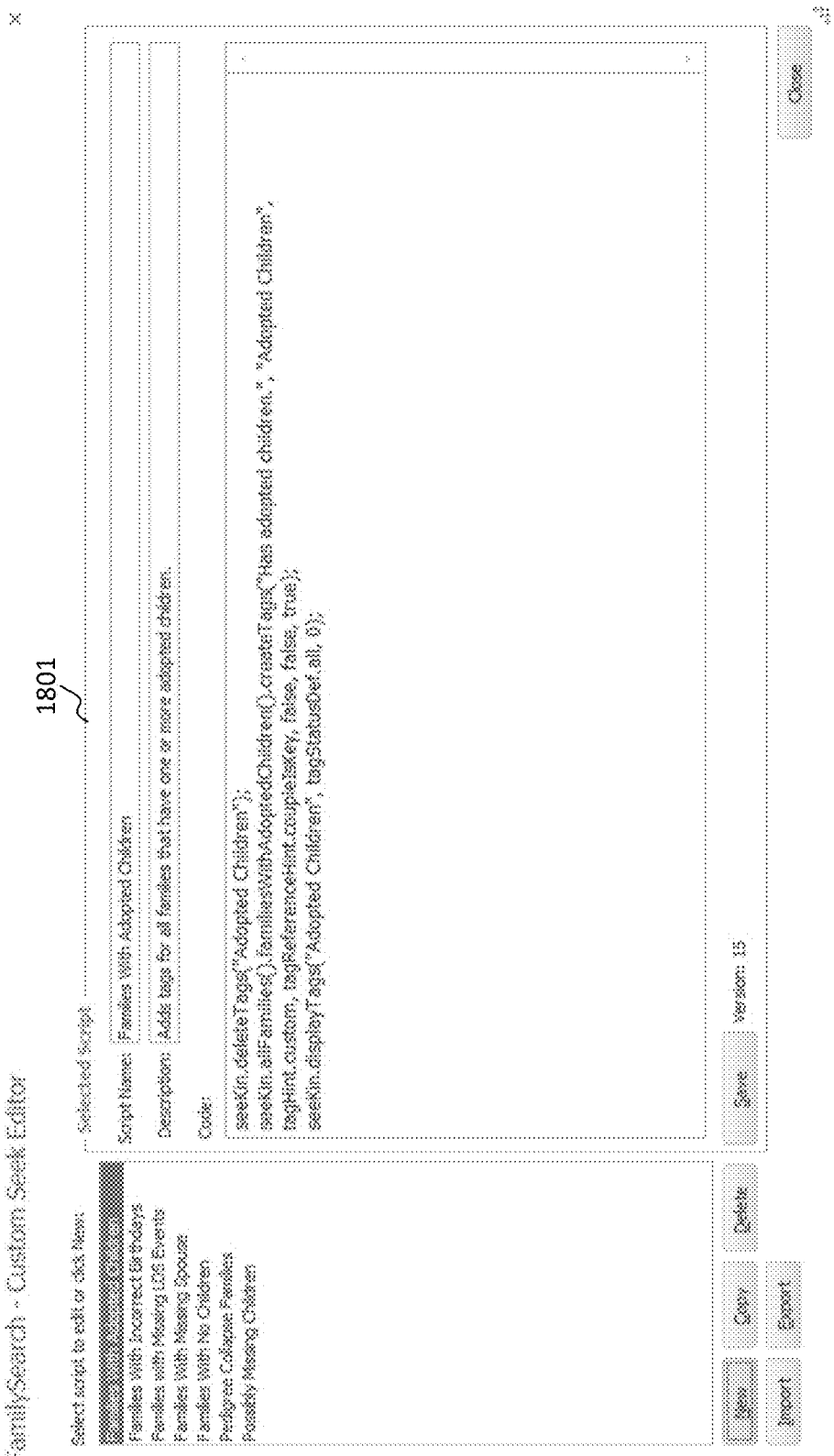
FIG. 18 shows the display of the SeeKin editor function.

In reference to FIG. 18, in conjunction with SeeKin tags, there is also SeeKin scripting 1801. These SeeKin scripts allow users to perform customized actions that allow tasks to be carried out quicker and more efficiently. These scripts can be used as a replacement to complex custom search scenarios. As an example a script could be made to identify all family blocks that have marriages to the same direct line within said number of generations. This script would identify any potentially incorrect marriages listed in the full family graph database. The software comes with a built-in script editor which allows the user to either edit or create new scripts. A code text box is provided to enter the script code and each script can be given a unique name and description that will be displayed in the SeeKin menu. These scripts can be imported and exported such that users can easily share scripts with one another.

Figure 19:
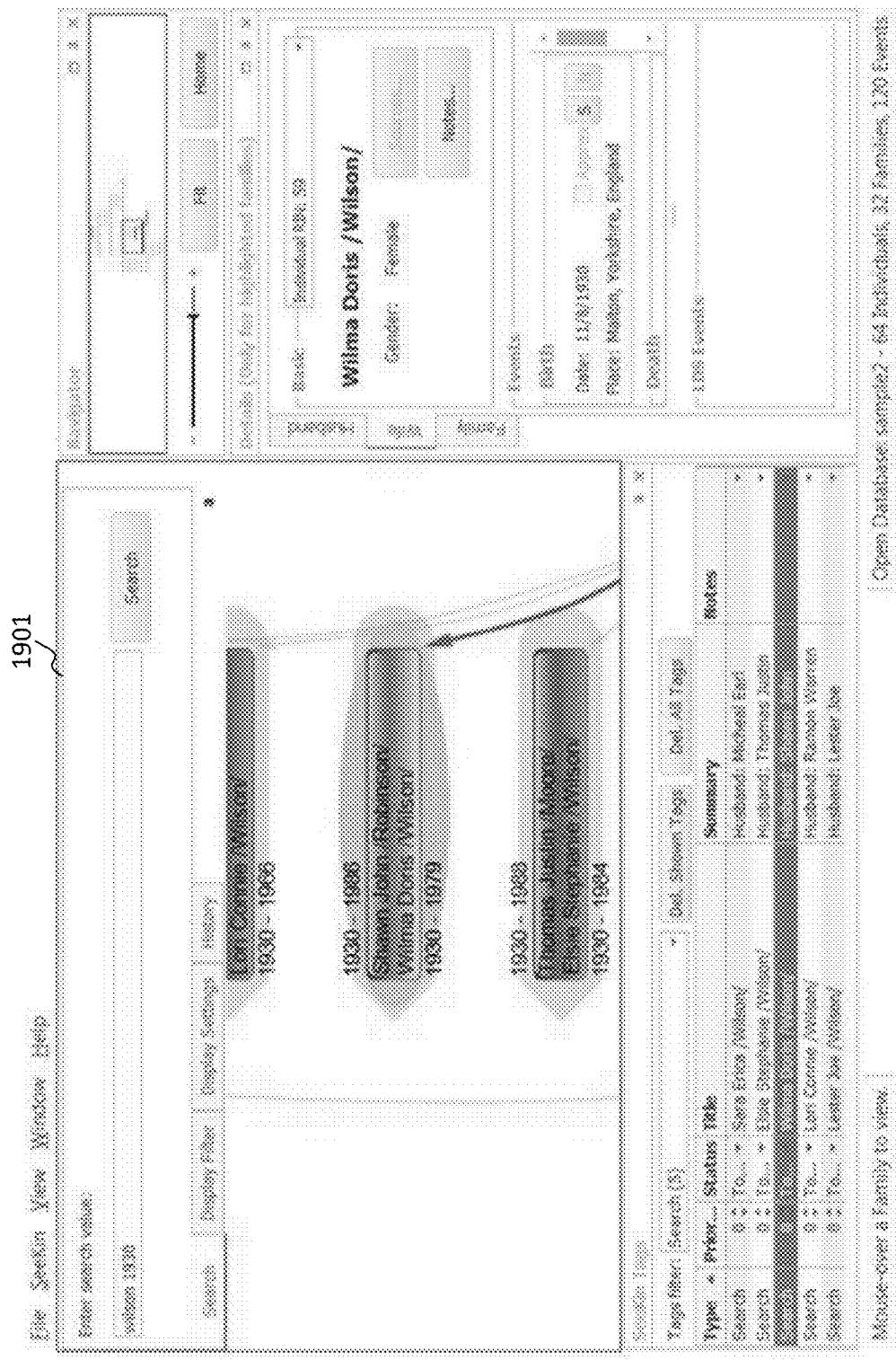
FIG. 19 shows the results of a search for 'Wilson 1930'.

In reference to FIG. 19, searches 1901 can also be carried out to locate particular information within the full family graph. The software allows the user to perform fast, freeform context searches without the need to specify the specific information. A single search box is provided in which the user can enter names or dates to be searched within the full family graph database. The software applies dates that are entered into the search field to date fields in the full family graph database. Names and places entered into the search field are applied to individual names and source information in the full family graph database. For each search result, a SeeKin tag is created and added to the SeeKin tags panel. The user can then view the search results by selecting a tag. When a tag is selected, the results will be highlighted in the full family graph. The search results are also displayed in a window located below the main display.

Although the invention has been explained in relation to its preferred embodiment, it is to be understood that many other possible modifications and variations can be made without departing from the spirit and scope of the invention as hereinafter claimed.

What is claimed is:

1. A non-transitory computer-readable medium that stores instructions executable by one or more processors to perform a method for displaying a full family relationship graph by using genealogical data, comprising
    instructions for building a database, comprising
        instructions for importing said genealogical data from external data sources, wherein
        said genealogical data comprising information of family individuals and family groupings, wherein
        a family grouping being defined as one selected from the group consisting of a husband and a wife with a least one child, a husband with at least one child, a wife with at least one child, and a husband and a wife, and
        said external data sources comprising Genealogical Data Communication (GEDCOM) files, Personal Ancestry File data, and third party application programming interfaces;
    instructions for assigning a unique identifier to each of said family individuals and each of said family groupings;
    instructions for formatting said genealogical data;
    instructions for identifying relationships among said family individuals and said family groupings;
    instructions for defining a family block, wherein said family block comprising a husband and a wife, a husband with an unknown spouse, a wife with an unknown spouse, or a child with no spouse;
    instructions for defining a family block as a root block;
    instructions for identifying a family member of said root block;
    instructions for identifying a family block comprising one member or two members of parents of said family member;
    instructions for identifying a family block of each son of said family member;
    instructions for building a stack comprising said root block, said family block of one member or two members of parents of said family member; and said family block of each son of said family member;

instructions for ordering family blocks in said stack based on genealogical information to generate an ordered stack; and instructions for displaying the family blocks in said ordered stack, wherein each of said family block in said ordered stack is displayed by a pictorial square box, and the pictorial square boxes are displayed in sequence order in accordance with the ordered stack.

2. The non-transitory computer-readable medium that stores instructions executable by one or more processors to perform the method for displaying a full family relationship graph by using genealogical data of claim 1, comprising said unique identifier being Globally Unique Identifier (GUID).

3. The non-transitory computer-readable medium that stores instructions executable by one or more processors to perform the method for displaying a full family relationship graph by using genealogical data of claim 1, comprising instructions for identifying a spouse of said family member;

instructions for identifying a family block comprising one member or two members of parents of said spouse; and instructions for displaying the family block of one member or two members of parents of said spouse by a pictorial square box.

4. The non-transitory computer-readable medium that stores instructions executable by one or more processors to perform the method for displaying a full family relationship graph by using genealogical data of claim 3, comprising instructions for identifying a daughter of said family member;

instructions for identifying a family block of said daughter; and instructions for displaying the family block of said daughter by a pictorial square box.

5. The non-transitory computer-readable medium that stores instructions executable by one or more processors to perform the method for displaying a full family relationship graph by using genealogical data of claim 4, comprising:

said family member is either a male or a female; and said genealogical information comprising age.

6. The non-transitory computer-readable medium that stores instructions executable by one or more processors to perform the method for displaying a full family relationship graph by using genealogical data of claim 5, further comprising:

instructions for identifying a given name of each son of said family member; and said genealogical information comprising said given name of each son of said family member.

7. The non-transitory computer-readable medium that stores instructions executable by one or more processors to perform the method for displaying a full family relationship graph by using genealogical data of claim 5, further comprising:

instructions for identifying a quantity of children of each son of said family member; and said genealogical information comprising said quantity of children of each son of said family member.

8. The non-transitory computer-readable medium that stores instructions executable by one or more processors to perform the method for displaying a full family relationship graph by using genealogical data of claim 4, comprising instructions for displaying a pictorial stack box by color one to enclose all pictorial square boxes of family blocks in said ordered stack;

instructions for displaying a relationship line pointing from parents or a patent to a son by color two;

instructions for creating a relationship line pointing from parents or a patent to a daughter by color three;

instructions for displaying all relationship lines representing bloodline relationship by solid lines; and instructions for displaying all relationship lines representing adoption relationship by dashed lines.

9. The non-transitory computer-readable medium that stores instructions executable by one or more processors to perform the method for displaying a full family relationship graph by using genealogical data of claim 8, wherein the displaying is on Portable Document Format (pdf), document (doc), Office Open XML (docx), Joint Photographic Experts Group (jpeg), a computer monitor, or a printed hard copy.

10. The non-transitory computer-readable medium that stores instructions executable by one or more processors to perform the method for displaying a full family relationship graph by using genealogical data of claim 8, comprising instructions for providing a pan function to said full family relationship graph, wherein said pan function allows a user to click and drag in order to change an area of focus on said full family relationship graph;

instructions for providing a zoom function to said full family relationship graph, wherein in a furthest zoomed out view a family block is represented by a rectangular block with no information other than lines defining relationship links, and in a most zoomed in view a family block comprises a rectangular block, a full name of a person and birth and death date of each person;

instructions for providing a navigator to said full family relationship graph, wherein said navigator allows the user to view full extent of said full family relationship graph in a smaller window, and indicates to the user a section is currently being viewed on a main display of said full family relationship graph;

instructions for providing an editing function to said full family relationship graph;

instructions for providing a relationship finder icon;

instructions for providing functions of tag and scripting, wherein said tags is used to create notes and other information pertaining to one or more family blocks and relationship links, and said scripting is used to allow the user to perform customized actions; and instructions for providing a search function, wherein said search function allows to locate particular information within said full family relationship graph.

11. A non-transitory computer-readable medium that stores instructions executable by one or more processors to perform a method for displaying a full family relationship graph by using genealogical data, comprising instructions for building a database, comprising instructions for importing said genealogical data from external data sources, wherein said genealogical data comprising information of family individuals and family groupings, wherein a family grouping being defined as one selected from the group consisting of a husband and a wife with a least one child, a husband with at least one child, a wife with at least one child, and a husband and a wife, and said external data sources comprising Genealogical Data Communication (GEDCOM) files, Personal Ancestry File data, and third party application programming interfaces;

instructions for assigning a unique identifier to each of said family individuals and each of said family groupings, wherein
said unique identifier being Globally Unique Identifier (GUID);
instructions for formatting said genealogical data;
instructions for identifying relationships among said family individuals and said family groupings;
instructions for defining a family block, wherein
said family block comprising a husband and a wife, a husband with an unknown spouse, a wife with an unknown spouse, or a child with no spouse;
instructions for defining a family block as a root block;
instructions for identifying a family member of said root block;
instructions for identifying a family block comprising one member or two members of parents of said family member;
instructions for identifying a family block of each son of said family member;
instructions for building a stack comprising said root block, said family block of one member or two members of parents of said family member; and said family block of each son of said family member;
instructions for ordering family blocks in said stack based on genealogical information to generate an ordered stack;
instructions for displaying the family blocks in said ordered stack, wherein
each of said family block in said ordered stack is displayed by a pictorial square box, and the pictorial square boxes are displayed in sequence order in accordance with the ordered stack;
instructions for identifying a spouse of said family member;
instructions for identifying a family block comprising one member or two members of parents of said spouse; and
instructions for displaying the family block of one member or two members of parents of said spouse by a pictorial square box.

12. The non-transitory computer-readable medium that stores instructions executable by one or more processors to perform the method for displaying a full family relationship graph by using genealogical data of claim 11, comprising
instructions for identifying a daughter of said family member;
instructions for identifying a family block of said daughter; and
instructions for displaying the family block of said daughter by a pictorial square box.

13. The non-transitory computer-readable medium that stores instructions executable by one or more processors to perform the method for displaying a full family relationship graph by using genealogical data of claim 12, comprising:
said family member is either a male or a female; and
said genealogical information comprising age.

14. The non-transitory computer-readable medium that stores instructions executable by one or more processors to perform the method for displaying a full family relationship graph by using genealogical data of claim 13, further comprising:
instructions for identifying a given name of each son of said family member; and
said genealogical information comprising said given name of each son of said family member.

15. The non-transitory computer-readable medium that stores instructions executable by one or more processors to perform the method for displaying a full family relationship graph by using genealogical data of claim 13, further comprising:
instructions for identifying a quantity of children of each son of said family member; and
said genealogical information comprising said quantity of children of each son of said family member.

16. The non-transitory computer-readable medium that stores instructions executable by one or more processors to perform the method for displaying a full family relationship graph by using genealogical data of claim 12, comprising
instructions for displaying a pictorial stack box by color one to enclose all pictorial square boxes of family blocks in said ordered stack;
instructions for displaying a relationship line pointing from parents or a patent to a son by color two;
instructions for displaying a relationship line pointing from parents or a patent to a daughter by color three;
instructions for displaying all relationship lines representing bloodline relationship by solid lines;
instructions for displaying all relationship lines representing adoption relationship by dashed lines; and
the displaying are on Portable Document Format (pdf), document (doc), Office Open XML (docx), Joint Photographic Experts Group (jpeg), a computer monitor, or a printed hard copy.

17. The non-transitory computer-readable medium that stores instructions executable by one or more processors to perform the method for displaying a full family relationship graph by using genealogical data of claim 16, comprising
instructions for providing a pan function to said full family relationship graph, wherein said pan function allows a user to click and drag in order to change an area of focus on said full family relationship graph;
instructions for providing a zoom function to said full family relationship graph, wherein
in a furthest zoomed out view a family block is represented by a rectangular block with no information other than lines defining relationship links, and in a most zoomed in view a family block comprises a rectangular block, a full name of each person and birth and death date of each person;
instructions for providing a navigator to said full family relationship graph, wherein said navigator allows the user to view full extent of said full family relationship graph in a smaller window, and indicates to the user a section is currently being viewed on a main display of said full family relationship graph;
instructions for providing an editing function to said full family relationship graph;
instructions for providing a relationship finder icon;
instructions for providing functions of tag and scripting, wherein said tags is used to create notes and other information pertaining to one or more family blocks and relationship links, and said scripting is used to allow the user to perform customized actions; and
instructions for providing a search function, wherein said search function allows to locate particular information within said full family relationship graph.

* * * * *